US007526465B1

(12) United States Patent
Forsythe et al.

(10) Patent No.: US 7,526,465 B1
(45) Date of Patent: Apr. 28, 2009

(54) HUMAN-MACHINE INTERACTIONS (75) Inventors: J. Chris Forsythe, Sandia Park, NM (US); Patrick G. Xavier, Albuquerque, NM (US); Robert G. Abbott, Albuquerque, NM (US); Nathan G. Brannon, Albuquerque, NM (US); Michael L. Bernard, Tijeras, NM (US); Ann E. Speed, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 196 days.

(21) Appl. No.: 11/083,428

(22) Filed: Mar. 18, 2005

Related U.S. Application Data (60) Provisional application No. 60/554,288, filed on Mar. 18, 2004.

(51) Int. Cl.
*G06N 5/00* (2006.01)
(52) U.S. Cl. .......................................... 706/55; 706/45
(58) Field of Classification Search .................. 706/55, 706/46, 45; 717/100, 141
See application file for complete search history.

(56) References Cited

U.S. PATENT DOCUMENTS

| | | | | |
|---|---|---|---|---|
| 4,847,784 A * | 7/1989 | Clancey | ...................... | 706/50 |
| 6,092,058 A * | 7/2000 | Smyth | ......................... | 706/10 |
| 6,260,033 B1 * | 7/2001 | Tatsuoka | ..................... | 706/45 |
| 6,295,509 B1 * | 9/2001 | Driskell | ...................... | 702/182 |
| 6,389,405 B1 * | 5/2002 | Oatman et al. | ................ | 706/46 |
| 6,505,202 B1 * | 1/2003 | Mosquera et al. | ............. | 707/10 |
| 6,751,508 B2 * | 6/2004 | Sasaki et al. | ................... | 700/1 |
| 6,907,417 B2 * | 6/2005 | Alpert | ......................... | 706/55 |
| 6,957,202 B2 * | 10/2005 | Skaanning et al. | ............ | 706/20 |
| 7,089,218 B1 * | 8/2006 | Visel | .......................... | 706/14 |
| 2003/0167454 A1 * | 9/2003 | Iordanov et al. | ............ | 717/104 |
| 2004/0015906 A1 * | 1/2004 | Goraya | ....................... | 717/141 |
| 2004/0030414 A1 * | 2/2004 | Koza et al. | ..................... | 700/1 |
| 2004/0049473 A1 * | 3/2004 | Gower et al. | .................. | 706/46 |
| 2004/0158766 A1 * | 8/2004 | Liccione et al. | ................ | 714/4 |
| 2004/0177053 A1 * | 9/2004 | Donoho et al. | ................ | 706/47 |
| 2004/0205038 A1 * | 10/2004 | Lee et al. | ...................... | 706/47 |
| 2004/0230951 A1 * | 11/2004 | Scandura | .................... | 717/120 |
| 2005/0234708 A1 * | 10/2005 | Meehan et al. | ................. | 704/9 |
| 2006/0026113 A1 * | 2/2006 | Omoigui | ...................... | 706/55 |

OTHER PUBLICATIONS

Hunter et al., "A Naturalistic Decision Making Model for Stimulated Human Combatants", May 16, 2000, 9th Conference on Computer Generated Forces and Behavior, Orlando, FL.*
Schoenwalk et al., "Simulation of a Cognitive Algorithm for a Distributed Robotic Sensing Network" Proceedings of the International Society of Robotics and Automation.*

(Continued)

*Primary Examiner*—Wilbert L Starks, Jr.
(74) *Attorney, Agent, or Firm*—Madelynne J. Farber (57) ABSTRACT

Digital technology utilizing a cognitive model based on human naturalistic decision-making processes, including pattern recognition and episodic memory, can reduce the dependency of human-machine interactions on the abilities of a human user and can enable a machine to more closely emulate human-like responses. Such a cognitive model can enable digital technology to use cognitive capacities fundamental to human-like communication and cooperation to interact with humans.

20 Claims, 10 Drawing Sheets

OTHER PUBLICATIONS

Forsythe. "From Cognitive Models to Cognitive Systems" Jun. 30-Jul. 2, 2003. Presentation at Cognitive Systems Workshop, Santa Fe, NM.*

Forsythe et al., "Using Psychologically Plausible Operator Cognitive Models to Enhance Operator Performance." . Oct. 10-Oct. 17, 2003. 46th Annual Meetings of the Human Factors and Ergonomics Society.*

Roth et al., "Cognitive Engineering: Issues in User-Centered System Design." 2001. New York: Wiley-Interscience, John Wiley & Sons.*

Forsythe et al., "Toward a Human Emulator: A Framework for the Comprehensive Computational Representation of Human Cognition." 2001.*

Forsythe et al., "Human emulation: Progress toward realistic synthetic human agents." 2002. Proceedings of the 11th Conference on Computer-Generated Forces and Behavior Representation.*

Corker et al., "An Architecture and Model for Cognitive Engineering Simulation Analysis: Application to Advanced Aviation Automation" 1993. Presented at the AIAA Computing in Aerospace 9 Conference.*

Forsythe. "Sandia National Laboratories Cognitive Systems Research and Development". 2003, Powerpoint.*

Forsythe et al. "Human Emulation: Prograss Towards Realistic Synthetic Human Agents" 2002. Proceedings of the 11th Conference on Computer-Genreated Forces and Behavior Representation, Orlando, FL.*

* cited by examiner

| Cues | Situations | | | |
|---|---|---|---|---|
| | A | B | C | D |
| 1 | -5 | -2 | 3 | 4 |
| 2 | -4 | -3 | 2 | 4 |
| 3 | 5 | 0 | -3 | 0 |
| 4 | 0 | -5 | 0 | -4 |

FIG. 11

| Cues | 1 | 2 | 3 | 4 |
|---|---|---|---|---|
| 1 | 0 | 1 | 1.5 | 2.75 |
| 2 | | 0 | 2 | 2 |
| 3 | | | 0 | 4.25 |
| 4 | | | | 0 |

FIG. 12

HUMAN-MACHINE INTERACTIONS

This invention claims priority to U.S. Provisional Patent Application Ser. No. 60/554,288, filed Mar. 18, 2004, incorporated herein by reference.

This invention was developed under Contract DE-AC04-94AL85000 between Sandia Corporation and the U.S. Department of Energy. The U.S. Government has certain rights in this invention.

FIELD OF THE INVENTION

The present invention relates generally to the field of digital technology and, more particularly, to human-machine interactions.

BACKGROUND OF THE INVENTION

Digital technology possesses varying degrees of intelligence and autonomy. Over time, these levels of intellect and autonomy can be expected to increase. Therefore, it is conceivable that some version of the reality depicted in science fiction, where humanity is immersed in an all-seeing, all-knowing, and sometimes hostile, digital environment, may be realized.

Most human-machine interaction models assume that humans will readily meld into the mix of software agents, robots and electronic systems, despite a history in which human limits have often bounded the potential of advanced technology. In these models, it is the responsibility of the human user to acquire a mental model of a machine in order to engage that machine in a productive interaction. Consequently, given advances in raw computing capabilities, human limitations have become the dominant factor in the following ratio:

$$\text{Overall System Value} = \frac{\text{Productive Output Human} - \text{Machine System}}{\text{Overall Resources Expended by Human}}$$

By reversing the situation so that the machine acquires a mental model of the human, technical factors such as computational power, storage capacity and communications bandwidth can become the primary factors driving the above ratio. Therefore, without the drag imposed by human limitations, the systems value can be freed to grow in proportion to the technical capabilities (e.g., computer power).

Varying levels of sophistication have been incorporated into current cognitive models. For instance, by increasing the volume and breadth of procedural knowledge, larger ranges of behavioral response can be observed in a machine. Current models intended to shift the burden from a human user to a machine have been designed on common rule-based, case-based reasoning, or general situation-based approaches.

Such cognitive models, however, do not enable a machine to respond with behavioral variability consistent with actual populations. For example, military and law enforcement personnel are often confronted with situations that are highly ambiguous and involve personal interactions. In such situations, humans use not only rules, but also draw from a rich personal history to make decisions. The application of current models to such circumstances would not enable a machine to make the judgment calls required to reach a resolution.

It is therefore desirable to provide a solution that can reduce the dependency of human-machine interactions on the abilities of a human user and can enable a machine to more closely emulate human-like responses. The present invention can provide this through the use of a cognitive model based on human naturalistic decision-making processes, including pattern recognition and episodic memory. Machines based on the cognitive model of the present invention can use cognitive capacities fundamental to human-like communication and cooperation to interact with humans.

BRIEF DESCRIPTION OF THE DRAWINGS

The above and further advantages of the invention may be better understood by referring to the following description in conjunction with the accompanying drawings, in which corresponding numerals in the different figures refer to the corresponding parts, in which.

DETAILED DESCRIPTION OF THE INVENTION

While the making and using of various embodiments of the present invention are discussed herein in terms of an individual cognitive aide, it should be appreciated that the present invention provides many inventive concepts that can be embodied in a wide variety of contexts. The specific embodiments discussed herein are merely illustrative of specific ways to make and use the invention, and are not meant to limit the scope of the invention.

The present invention can provide a cognitive model based on human naturalistic decision-making processes, including pattern recognition and episodic memory. Machines based on the cognitive model of the present invention can use cognitive capacities fundamental to human-like communication and cooperation to interact with humans. The present invention can reduce the dependency of human-machine interactions on the abilities of a human user and can enable a machine to more closely emulate human-like responses. For purposes of this discussion, the present invention will be described with reference to an individual cognitive aide and its use in a specific task environment. This is not intended to limit the scope of this invention to the presented conditions.

Exemplary embodiments of a cognitive aide in accordance with exemplary embodiments the present invention can include the following characteristics: portable and transparent, goes where you go, ubiquitously becomes your digital shadow; knows what you do, when you do it and how you do it; knows what you know and what you don't know; comprehends your goals, priorities, sensitivities, interests and preferences; co-evolves, adapting as you learn from various experiences; applies meta-cognitive self-awareness to enhance its effectiveness, calibrate itself, and detect and overcome its own deficiencies, inaccuracies and potential corruption; mediates between you and other agents, acting as your emissary and shield; offers a breadth of practical functionality and may serve as your mentor/tutor by tracking your progress and engaging you in scenarios that foster your learning and adaptability; interaction occurs through a dialogue-based natural language interface; and trusted, behaves as a devoted confidant who cannot be compromised. The cognitive aide of the present invention can be implemented, for example, in personal digital assistants ("PDAs"), personal computers ("PCs"), and training simulators.

Exemplary embodiments of the cognitive aide of the present invention can be derived from conventionally known methods for constructing cognitive models based on the knowledge of a specific individual that process information and interpret events consistent with that individual. Exemplary embodiments of a modeling framework of the present invention is unique in its instantiation of human naturalistic decision making and foundation in oscillating systems ideas concerning the neurophysiology underlying human cognition. Exemplary embodiments of a framework for the cognitive aide of the present invention can provide capabilities enabled by conventionally known psychologically plausible models of human multi-modal memory representation, cognitive-affective interplay and meta-cognition. In addition, exemplary embodiments of the cognitive aide of the present invention can prompt a fundamental change in computing whereby the human-machine interaction can become more like a human-human interaction using an agent that can utilize a psychologically plausible model of human cognition.

Figure 1:
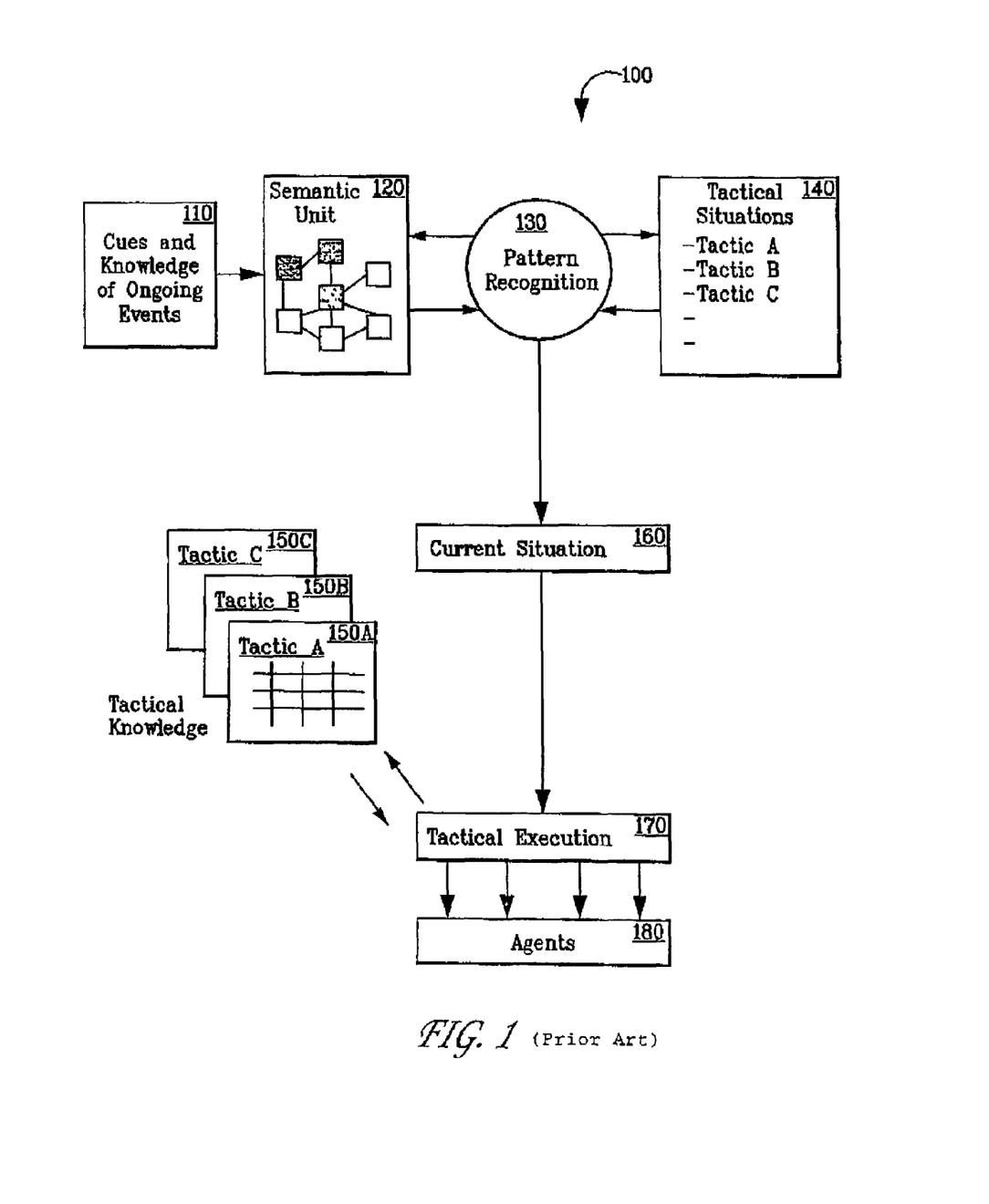
FIG. 1 diagrammatically illustrates a computational representation of conventionally known recognition-primed decision ("RPD") making.

FIG. 1 illustrates a conceptual depiction of how conventionally known recognition-primed decision ("RPD") making can be represented computationally. However, the resulting decision maker derived from this model is idealized. In other words, the behaviors of the decision maker and its decision making processes were strictly determined by its inputs and knowledge, without being affected by fear, arousal, stress, etc. Furthermore, cognitive agents based on this model do not exhibit individual differences attributable to cultural factors or personal experiences ("organic" factors).

In the purely psychological cognitive model as illustrated in FIG. 1, knowledge elicitation involves the identification of "situations" and "cues," and the derivation of quantitative data expressing (1) the relationships between situations (tactical situations 140) and cues for pattern recognition 130 and (2) the relationships between cue-pairs for constructing an associative network in which each cue can be represented as a node in the network. Operationally, streaming input 110 (cues and knowledge of ongoing events) from the task environment can feed perceptual algorithms (semantic unit 120). These algorithms can operate in parallel and depending on the corresponding cue in the associative/semantic network 100, provide either a continuous or discrete level of activation (tactical execution 170). For a given perceptual algorithm, if the level of activation is sufficient, a response will be elicited from the corresponding node (tactical knowledge 150A, 150B, and 150C) in the associative/semantic network 100. The associative/semantic network 100 can be modeled as an oscillating system wherein each node is a separate oscillator. Perceptual activation causes corresponding nodes to begin oscillating with activation spreading to other nodes for which there exists an associative/semantic relationship. Spreading activation between nodes in the associative/semantic network 100 may be sufficient to cause a node receiving activation to begin oscillating or may prime the node such that the node exhibits a lowered threshold for activation by perceptual processes.

Situational recognition (current situation 160) occurs when there is activation of a pattern of nodes (pattern recognition 130) in the associative/semantic network 100 that corresponds to a given situation (situational knowledge/tactical situations 140). Computationally, recognition is based on an evidence accumulation process in which cues differentially contribute to or subtract from the evidence for different situations and the evidence for each situation can be periodically updated providing an ongoing level of evidence for each situation At any given point in time, multiple situations may have sufficient evidence for their recognition (i.e., multi-tasking). Upon the recognition of the current situation 160, tactical knowledge 150A, 150B, and 150C can be applied to select an appropriate tactic (tactical execution 170) which can then be executed by agents 180.

Due to the lack of inclusion of "organic" factors in the model as illustrated in FIG. 1, exemplary embodiments of the present invention can use a two-tiered approach in which knowledge can be represented using a psychological model, with a separate physiological model serving as an engine that can drive the psychological model. An exemplary two-tiered approach is disclosed in U.S. patent application Ser. No. 10/426,105, filed on Apr. 29, 2003, and incorporated herein by reference.

Figure 2:
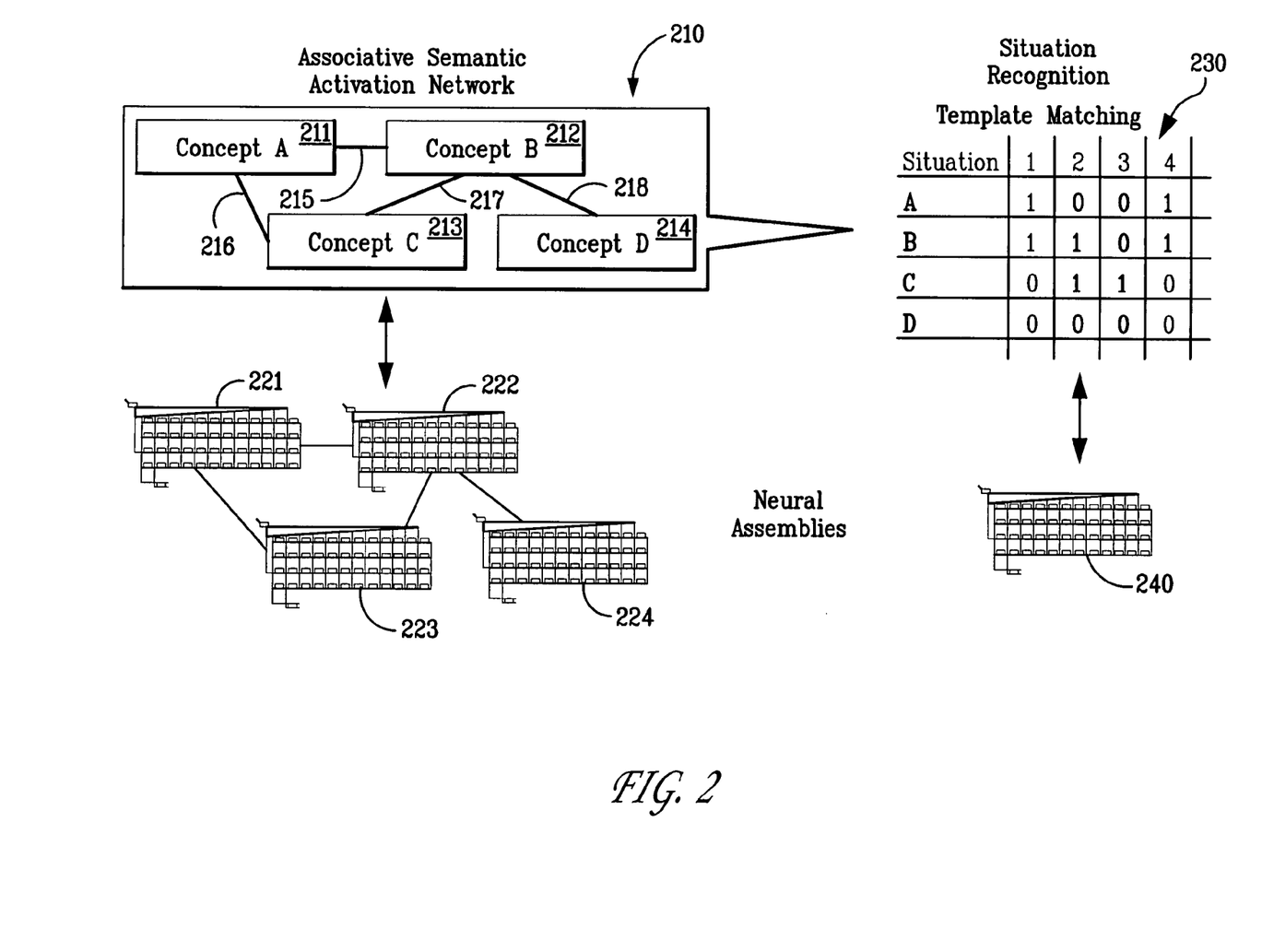
FIG. 2 diagrammatically illustrates an exemplary emulator framework in accordance with exemplary embodiments of the present invention.

As illustrated in FIG. 2, a semantic activation network 210 can be used to represent semantic unit 120 of FIG. 1 activated by individual elements of a situation, such as situation 160 of FIG. 1. The exemplary embodiment illustrated in FIG. 2 includes a network of nodes 210 for individual concepts (211, 212, 213, and 214), and associative links (215, 216, 217, and 218) between nodes that differ in their strength of association. Each concept (211, 212, 213, and 214) of the psychological model can be assigned a separate neural assembly (221, 222, 223, and 224), and the activation of each concept (211, 212, 213, and 214) can be a function of the activation of the corresponding neural assembly (221, 222, 223, and 224). In some exemplary embodiments, situation recognition can be represented by a template 230 matching process. In the exemplary embodiment illustrated in FIG. 2, rows of template 230 can represent known situation schema and columns can correspond to concepts 211, 212, 213, and 214 in the knowledge network. Also in the exemplary embodiment illustrated in FIG. 2, situation recognition can be assigned a separate neural assembly 240. In some exemplary embodiments, binary numbers can indicate the activation, or lack of activation, of individual concepts during a given time period. Recognition can occur incrementally in accordance with a conventional race model and when a threshold is exceeded, an activation of the situation schema can occur.

Figure 3A:
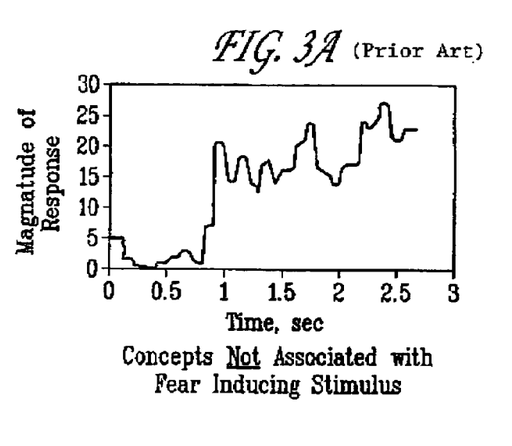
FIGS. 3A-D graphically illustrates differential responses under stimulus as conventionally known to workers in the art.
Figure 3B:
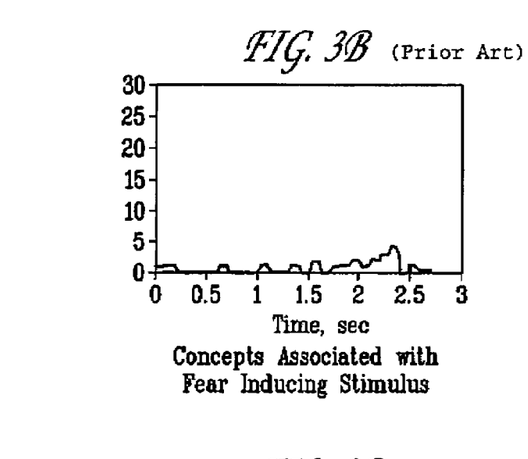
Figure 3C:
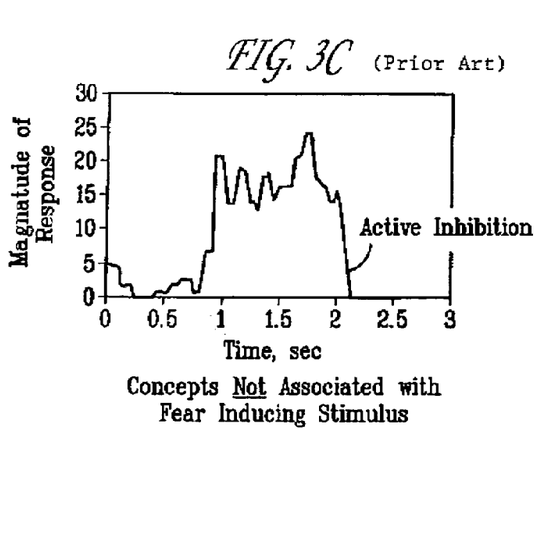
Figure 3D:
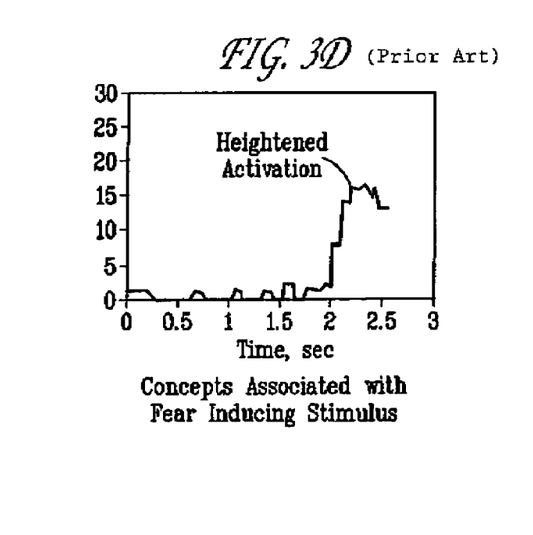

By incorporating organic factors into the model illustrated in FIG. 2, more human-like responses can be emulated. As illustrated in FIGS. 3A-D, human responses are affected by organic stimulus (e.g., fear). In FIGS. 3A-D, the y-axis represents the magnitude of response to a concept, such as concepts 211, 212, 213, and 214 of FIG. 2, and the y-axis represents the elapsed time in seconds. Concepts, such as concepts 211, 212, 213, and 214 of FIG. 2, and situations can be assigned emotional associations (e.g., fear). The activation of such emotional associations can affect the activation of a concept, such as concepts 211, 212, 213, and 214 of FIG. 2. In FIG. 3A, the graph represents a response to a concept that is not associated with fear inducing stimulus and without the inclusion of an emotional association, such as fear. FIG. 3C represents a response to the same concept as 3A with the inclusion of an emotional association, such as fear. The inclusion of the emotional association (e.g., fear) results in a change in the response. In FIG. 3C, the response which originally tracked that of FIG. 3A is actively inhibited when the fear inducing stimulus is introduced at approximately time=2 seconds. In FIG. 3B, the graph represents a response to a concept that is associated with fear inducing stimulus and also without the inclusion of the emotional association, such as fear. FIG. 3D represents a response to the same concept as 3B with the inclusion of an emotional association, such as fear. The inclusion of the emotional association (e.g., fear) results in a change in the response. In FIG. 3D, the response which originally tracked that of FIG. 3B is heightened when the fear inducing stimulus is introduced at approximately time=2 seconds. One method for introducing an organic factor, such as an emotional association, can be adjusting an input representative of a pulse to simulate, for example, arousal.

Figure 4:
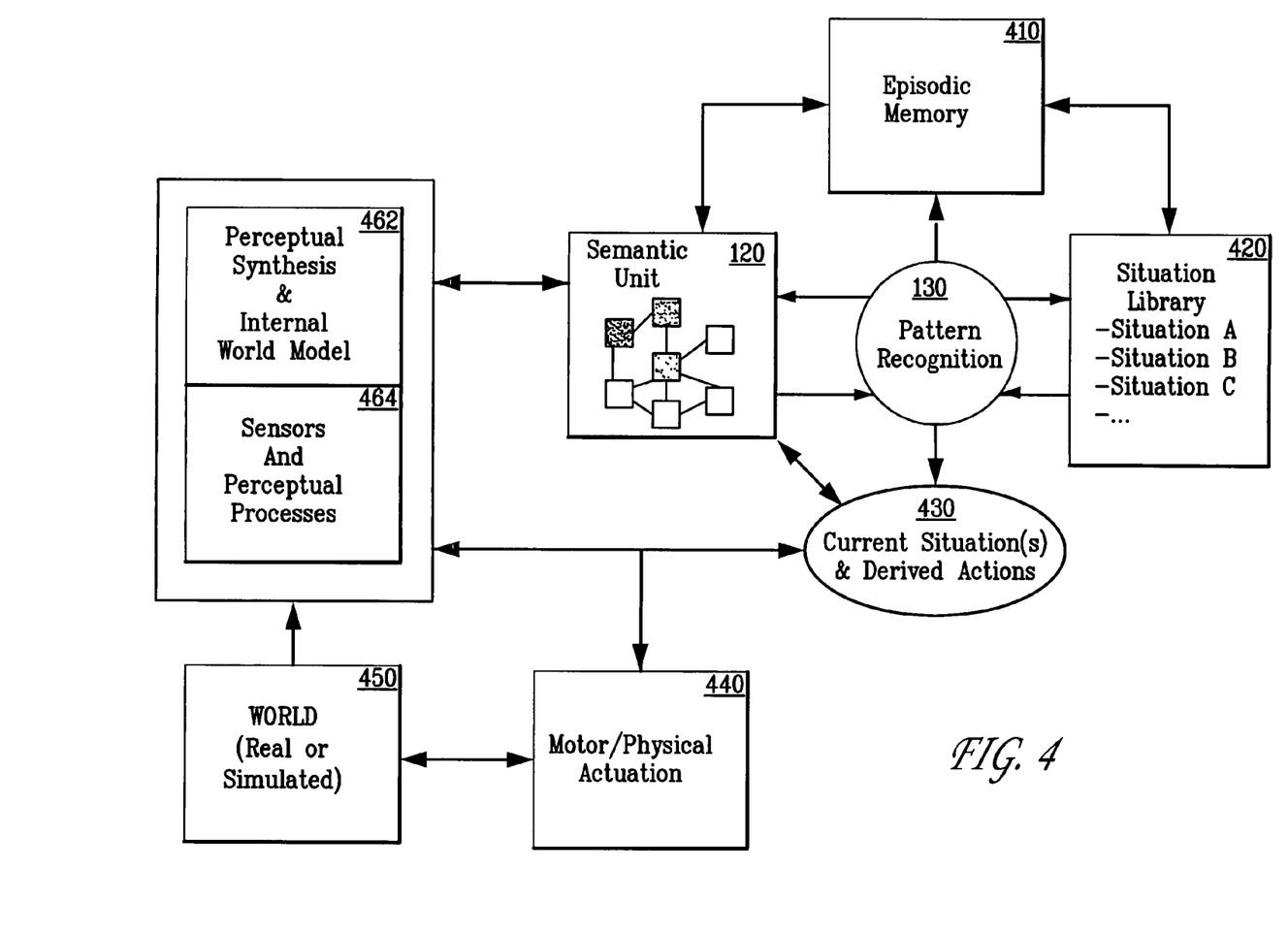
FIG. 4 diagrammatically illustrates exemplary embodiments of integration of an RPD model into an embodied agent framework in accordance with exemplary embodiments of the present invention.

Generally, the knowledge endowed to synthetic entities (e.g., cognitive aides), has been restricted to that directly relevant to the application domain. For example, a synthetic fighter pilot knows about air combat and nothing else. In reality, individuals have a collective life experience that may exert as strong, and sometimes stronger, influence on decisions than domain knowledge. Furthermore, differences in personal experience are conventionally known to be a primary factor accounting for the individual variability observable in human behavior. Therefore, while RPD as illustrated in FIG. 1 can provide a computational representation resulting in an idealized decision-maker, the inclusion of an episodic memory 410 as illustrated in the exemplary embodiment of FIG. 4, can endow synthetic entities with a "synthetic life history." Actuator 440 can physically move a synthetic entity throughout world 450. Sensors 464 can be used to obtain information about the environment (world 450). The information can then be stored, forming an internal world model 462, and used for comparisons by semantic unit 120 and pattern recognition 130 with previously stored information (episodic memory 410, situation library 420) and with later obtained information that can be obtained from current situations 430. For example, two (2) robotic vehicles, each having been exposed to various environments and circumstances, both systematically search a building for smoke sources. Based on their individual sensors, communications and data processing capabilities, they each can work their way through the building accumulating further data which can activate different concepts in their individual semantic networks.

Figure 5:
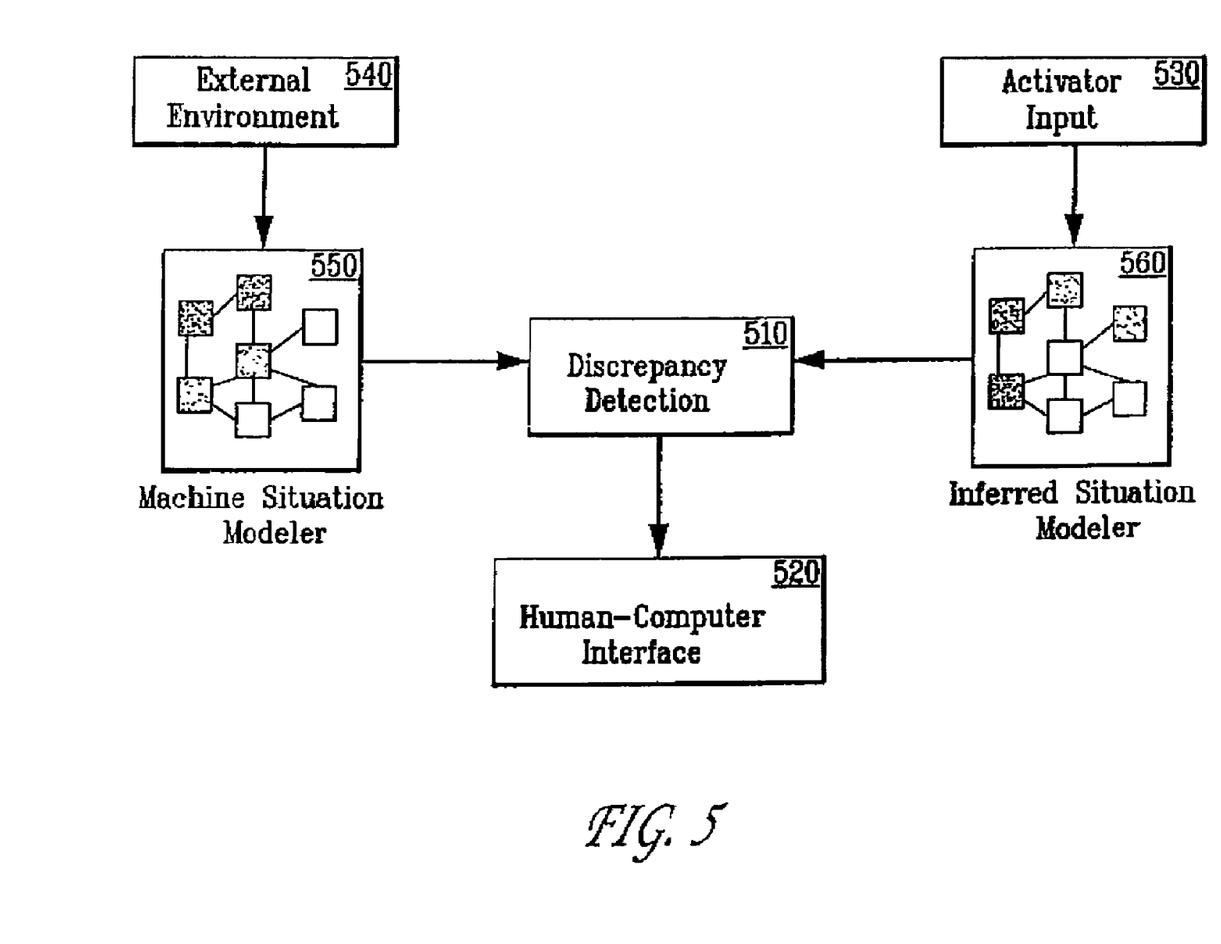
FIG. 5 diagrammatically illustrates exemplary embodiments of a system including a cognitive model in accordance with exemplary embodiments of the present invention.

As illustrated in the exemplary embodiment of FIG. 5, operating in real-time, the cognitive model of the present invention, as applied to reflect the knowledge of an individual operator, can be used to interpret the ongoing state of a system. To the extent that the system has accurate and timely data concerning its own state, and the operator on whom the model was based has a fundamental understanding of the system and associated tasks, this can serve as an exemplary cognitive processor in that it has an essentially unlimited capacity to process multiple cues in parallel.

In the exemplary embodiment illustrated in FIG. 5, discrepancy detection 510 can be accomplished using real-time data obtained from an operator via activator input 530 and data obtained from external environment 540. The operator's actions, or lack of action, can be acquired via activator input 530. In some exemplary embodiments, activator input 530 can include data such as mouse and/or joystick movement, visual fixation, keyboard input, audio communications, eye-tracking and physiological indicators associated with situation recognition processes. Inferred situation modeler 560 can create a model from data obtained via activator input 530. Inferred situation modeler 560 can represent the operator's perception of a given situation. Machine situation modeler 550 can create a model from data obtained from external environment 540. For each situation in machine situation modeler 550, typical actions can be identified. In some exemplary embodiments, discrepancy detection 510 can be triggered when an operator either commits an action that is inappropriate given relevant situations or an excessive period of time transpires in which an operator does not execute an action that is expected given relevant situations. This decision can be based on a comparison of machine situation modeler 550 with inferred situation modeler 560 by discrepancy detection 510. In some exemplary embodiments, feedback can be supplied to the operator via human-computer interface 520.

For purposes of this discussion, exemplary embodiments for the creation of a cognitive aide in accordance with exemplary embodiments of the present invention will be described with reference to a simulated task environment for training fighter pilots. The simulation is comprised of a single layout with zoom-in and zoom-out capabilities for the game area of the screen. An example of the screen layout is provided in FIG. 9. The layout is composed of a left side game-playing area 910 (indicated with a grid) and a right side, game-status area 950 (indicated in solid).

Figure 9:
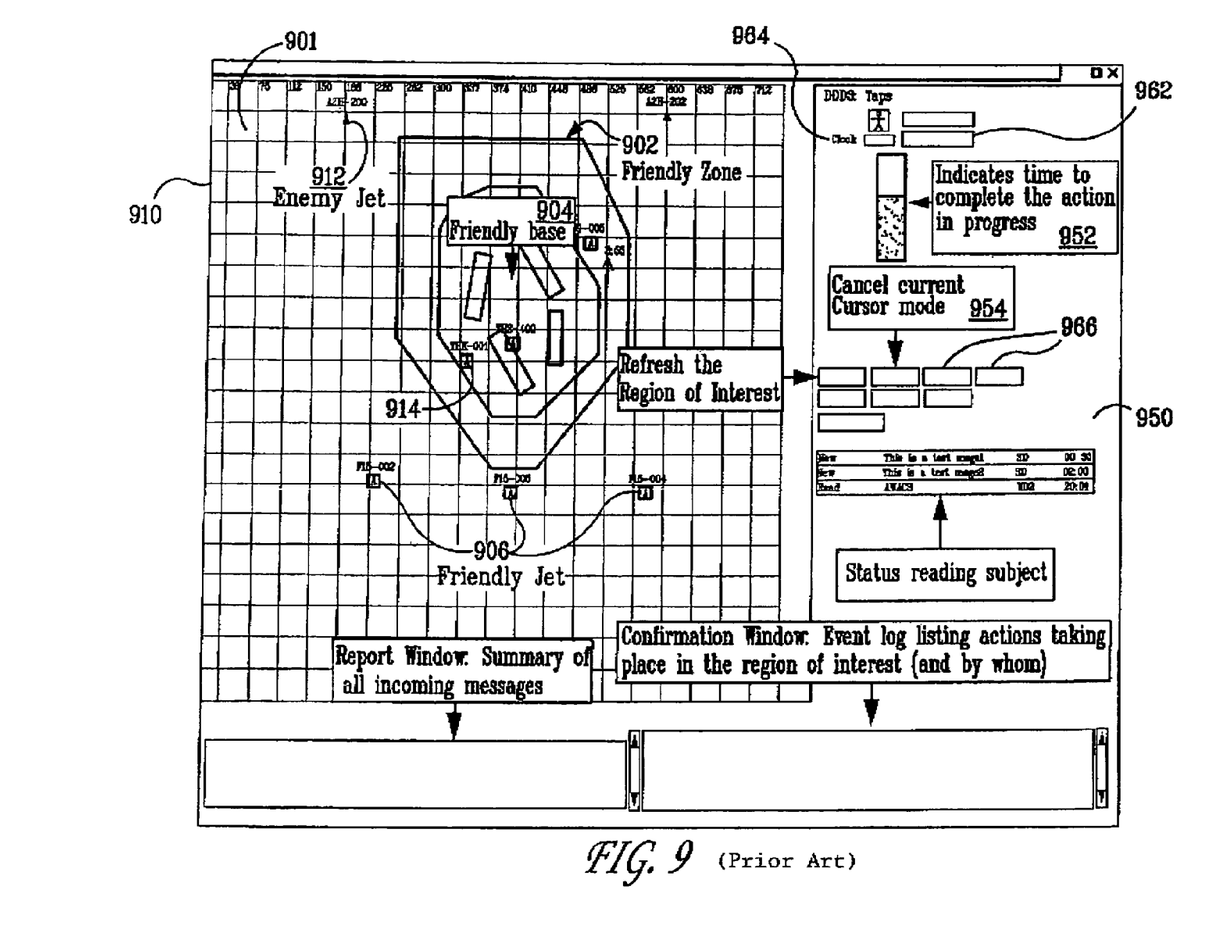
FIG. 9 diagrammatically illustrates a simulated task environment for piloting a fighter plane.

Game-playing area 910 can display friendly zone 902, friendly bases 904, fighters 906 and tanker 914 jets, as well as neutral, enemy 912, and unidentified jets. Outside the friendly zone is an AWACS jet (can be any one of friendly jets 906), which provides radar information. Each grid space 901 of game-playing area 910 represents 38 nautical miles in the x and y dimensions.

Enclosed within friendly zone 902 there can be two bases 904, each housing two jets (not shown in FIG. 12) at the onset of the game. Also within friendly zone 902 can be two (2) air-refueling tankers 914 and six (6) other friendly jets 906. Friendly jets 906 can be directed to fly at fast, medium, or slow speeds. The fuel consumption rate for each jet is determined by its flight speed.

Friendly fighter jets 906 typically need to be refueled sometime during the game. The refueling process can be performed by either refueling jets 906 from tanker 914, or by sending them to the nearest base 904. In addition, it is common for jets 906 to need rearming after several enemy engagements, which is done by having them return to one of bases 904.

Jets on the screen can either be: (1) friendly 906, which is indicated by a description stating the type of fighter jet and its call-sign (e.g., F15 005) over a box indicating its current status (e.g., an "A" indicating it is active), (2) neutral (not shown), indicated by a green inverted u-shaped object, or (3) enemy 912, indicated by a red chevron. Before enemy 912 or neutral jets are identified, typically by the radar of a friendly jet 906, they are portrayed as yellow u-shape objects.

Game status area 950 provides information and control functions. In this area, information is provided concerning the status of friendly 906 and enemy 912 jets, the defense score 962, and the time needed to complete ongoing sorties 952. This area also contains a clock 964, the "Zoom In" and "Zoom Out" controls 966, as well as an action "Cancel" control 954. Sessions can require approximately 25 minutes from start to finish.

The task to be performed involves a number of actions and sub-actions. However, most of these actions are in support of two main goals, which are to protect friendly zone 902 by attacking enemy jets 912, and to sustain friendly jets 906 by refueling and rearming.

To initiate an attack, friendly jet 906 needs to be within firing range. The firing range of a particular jet will depend on the numbers and types of missiles onboard the jet. Initially, each friendly fighter jet 906 has two long-range and two medium-range missiles, as well as an indeterminate number of short-range missiles. Once long and medium-range missiles have been exhausted, friendly jets 906 must be in closer proximity to enemy jets 912 to launch an attack. During an attack, the attacking friendly jets(s) 906 and the enemy jets 912 under attack will labeled with an "X" symbol to indicate that they are engaged. Attacking jets are unable to perform other actions until the attack is complete. After the attack is completed, the friendly jets 906 may be directed to other targets.

The process of refueling requires several steps that necessitate "zooming in" for better visual control in aligning the fighter jet 906 with the tanker 914. While zoomed in, other actions are taking place outside the view of the player. In order to refuel, a tanker 914 needs to be in an orbit near the jet 906 to be refueled. Once the tanker 914 is in orbit, the jet 906 to be fueled must request to orbit next to the tanker 914. After the jet 906 is in orbit next to the tanker 914, it must request to be refueled. The refueling process lasts approximately fifteen seconds. After a jet 906 is refueled, it may be directed to other locations.

Performance is measured by calculating the number of times enemy jets 912 penetrate friendly zone 902 (reflected in a lower defense score 962), the total number of friendly 906 and enemy 912 jets shot down, and the number of times a friendly jet 906 crashed due to lack of fuel.

Training begins with participants gaining a general understanding of the objectives and rules for the task environment by reading associated manuals. The objectives of the game are: protect friendly assets, high value assets include bases 904, tankers 914, and fighter 906 aircraft; refuel fighter 906 aircraft and tankers 914 when needed, either from a tanker 914 or base 904; and engage enemy assets by pursuing and attacking enemy 912 aircraft that endanger friendly assets. In order to carry out these functions, certain actions must be performed: when friendly assets that are under a participant's control are threatened, they are warned in time to fight or flee; when attacked, the mission objectives are to protect friendly assets and attack enemy forces, requiring the use of lethal force; and to fight, participants pursue the enemy (orient for fire) and initiate an attack that is within the capabilities of their weapons. Thus, an important aspect of the game is to maintain awareness of weapons status and capabilities, as well as the fuel status of each friendly jet 906.

Figure 10:
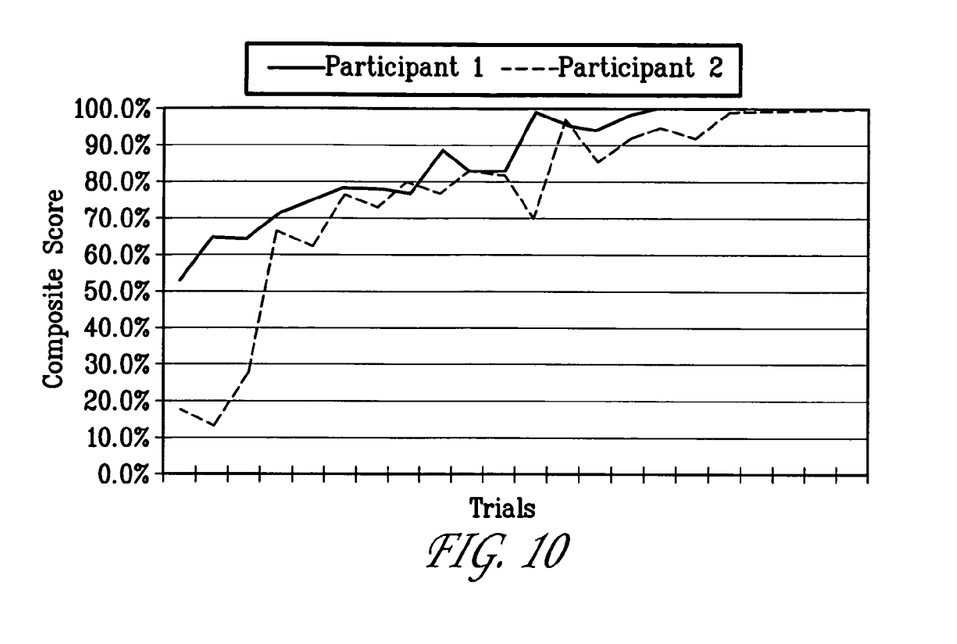
FIG. 10 graphically illustrates the learning curve for two (2) participants using the simulated task environment illustrated in FIG. 9.

The participants then practice until they achieve a criterion level of expertise for the task environment. The criterion for expert performance consists of having the knowledge and skills to consistently complete sessions (1) without the loss of friendly aircraft 906 due to lack of fuel or enemy missiles, (2) without enemy incursion into friendly zone 902, and (3) with the destruction of all enemy jets 912. Other measures of performance can be included in the criterion the time taken to destroy all enemy jets 912 and the number of attacks on enemy jets 912. FIG. 10 illustrates the learning curve found with two (2) participants. In FIG. 10, the x-axis represents the number of times the game was played and the y-axis represents the score for each game played. As can be seen from FIG. 10, the scores of both participants improved with an increasing number of trials, eventually more consistently reaching scores above 90.0%.

Once participants reach a criterion level of expertise, they are instructed to create decision trees with regard to the specific "yes" or "no" decisions they made while performing the task as described above. This includes the particular cues that prompted them to implement certain actions, as well as the actions in response to those cues. Creating a decision tree enables the visualization of each contingent step in the task. This, in turn, facilitates the participant's identification of situations, the cues that determine situations, and the specific actions taken as a consequence of situations. Because of the fluidity of the task, the decision trees produced by participants were pliable and adaptive, as opposed to trees reflecting a rigid, sequential process. This provided further indication that the task presented participants with a non-trivial level of cognitive complexity.

Figure 8:
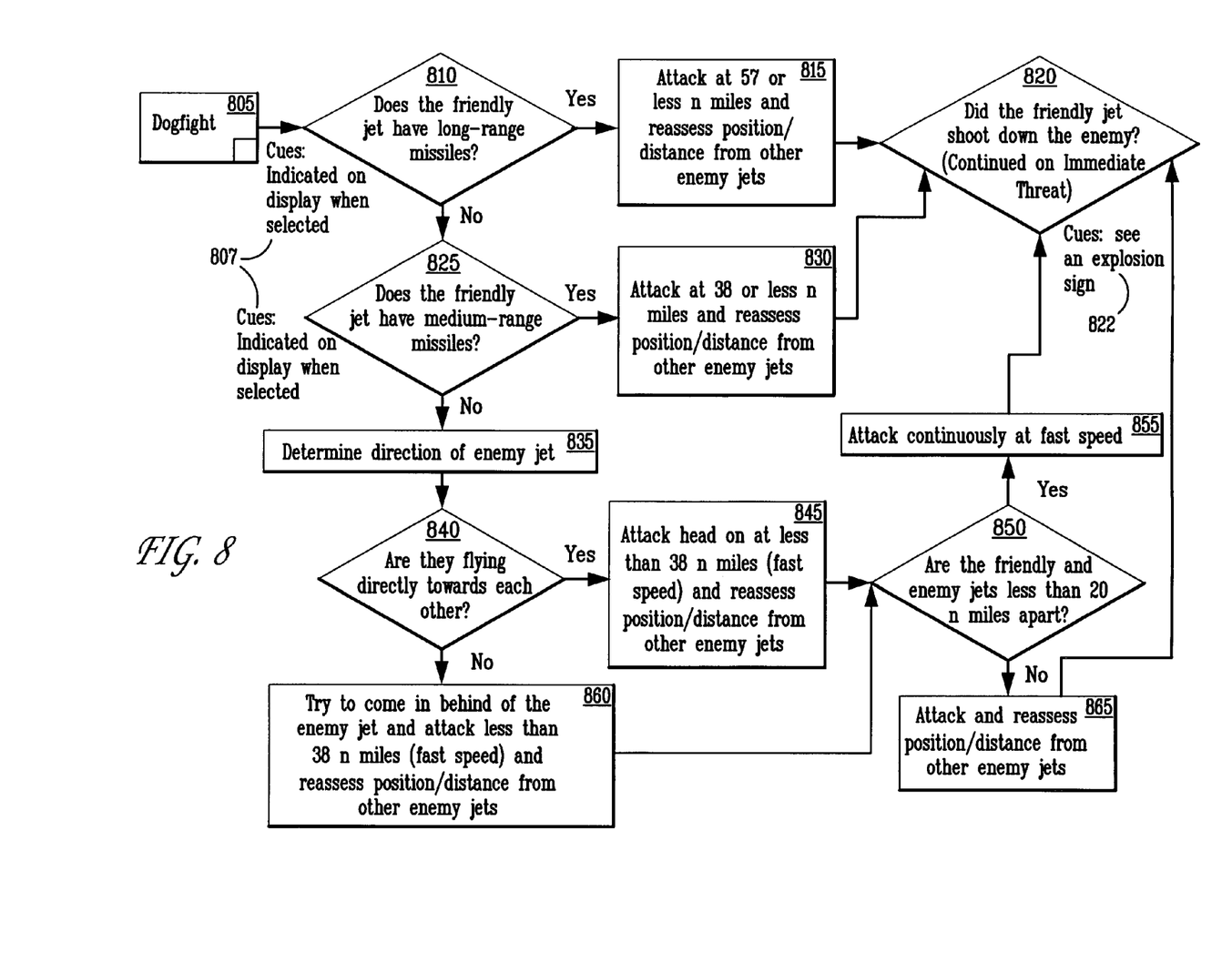
FIG. 8 illustrates an exemplary flowchart of decision making for an aerial dogfight scenario.

An exemplary embodiment of a decision tree is illustrated in FIG. 8. With a task of dogfight 805 identified, a set of cues 807 is recognized from which decision 810 (possession of long-range missiles) can be made. If decision 810 is a "Yes," then an attack 815 can be made from a distance of 57 nautical miles or less. Determination 820 of whether or not attack 815 was successful can be based on visual cues 822, such as seeing an explosion or representation of an explosion. If decision 810 is a "No," then decision 825 (possession of medium-range missiles) can be made. If decision 825 is a "Yes," then an attack 830 can be made from a distance of 38 nautical miles or less. Determination 820 of whether or not attack 830 was successful can be based on visual cues 822, such as seeing an explosion or representation of an explosion. If decision 825 is a "No," then determination 835 (direction of enemy jet) can be made. Decision 840 (friendly jet and enemy jet flying towards each other) is based on determination 835. If decision 840 is a "Yes," then attack 845 can be made by attacking head on at less than 38 nautical miles, continuously reassessing positions of other enemy jets. Decision 850 (distance between friendly and enemy jets less than 20 nautical miles) can be made by assessing the position of the enemy jet currently being targeted for head on attack. If decision 850 is "Yes," then attack 855 can be made by attacking continuously at fast speed. Determination 820 of whether or not attack 855 was successful can be based on visual cues 822, such as seeing an explosion or representation of an explosion. If decision 850 is "No," then attack 865 can be made and a reassessment of the position of other enemy jets can be made. Determination 820 of whether or not attack 865 was successful can be based on visual cues 822, such as seeing an explosion or representation of an explosion. If decision 840 is a "No," then attack 860 can be made by attacking from behind at less than 38 nautical miles, continuously reassessing positions of other enemy jets. Decision 850 (distance between friendly and enemy jets less than 20 nautical miles) can be made by assessing the position of the enemy jet currently being targeted for attack from behind. The flow then continues as described above.

After development of decision trees, each participant identifies situations, along with their respective cues and action(s). The cues consist of both positive occurrences (positive cues), as well as negative occurrences (negative cues). For example, the situation "Need to refuel" can be supported by the positive cue, "warning from communication screen indicating low fuel" and can be contradicted by the negative cue, "jet just refueled." The subsequent actions for the "Need to refuel" situation would be to "evaluate jet's proximity to tanker" and to "Evaluate jet's proximity to base".

Once cues and situations had been identified, participants are instructed to indicate how related each cue is to each situation. The ratings can be on a −5 to +5 scale, where −5 indicates that a cue never occurs with the situation, 0 indicates that the cue may or may not occur with the situation, and does not carry information specific to the situation, and +5 indicates that the cue always occurs with the situation.

The weights can serve two (2) purposes. First, they can permit the linking of cues to the situations in a quantitative manner, which can enable the pattern recognition portion of the present invention. Second, they can indicate the relationships between cues based on their co-occurrence across all situations and the similarity of the absolute value of their weights in those situations. To accomplish this, a situation-to-cue matrix can be created to diagram each instance where a cue is related to a particular situation on the abovementioned −5 to +5 scale.

Figure 11:
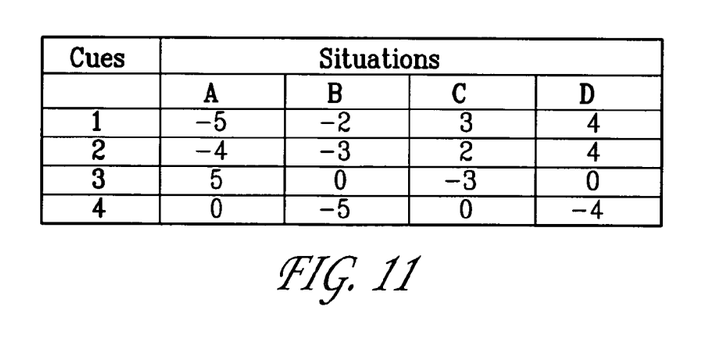
FIG. 11 tabularizes the weighted scores for cues and situations identified by the two (2) participants.

Once each cue has been rated, a proximity matrix can be developed in order to assess the interrelatedness of each cue pair. The proximity matrix quantifies both the co-occurrence of cues across situations, as well as the similarity of the absolute value of their participant-assigned weights. This can be done by calculating the difference in the absolute values of the weighted scores between each row of cues across all situations. A weighted score for each cue value can then be derived. In FIG. 11, situations are identified as columns A, B, C, and D and cues are identified as rows 1, 2, 3, and 4. Using the scores from FIG. 11 to derive an index for cues 1 and 3, the difference scores for each situation are:

$$
\begin{array}{l}
\text{A.} \ 5-5=0 \\
\text{B.} \ 2-0=2 \\
\text{C.} \ 3-3=0 \\
\text{D.} \ 4-0=\underline{4} \\
\phantom{\text{D.} \ 4-0=} 6
\end{array}
$$

Figure 12:
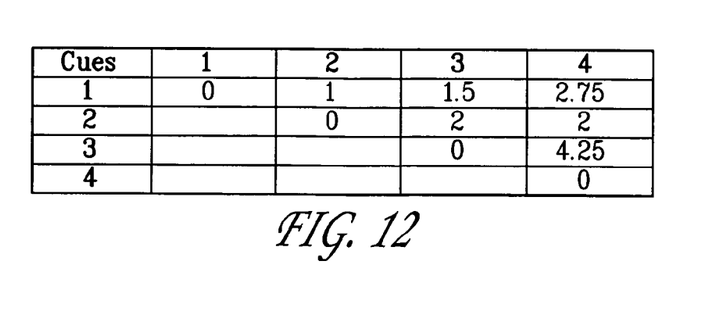
FIG. 12 tabularizes the interrelatedness of the cue pairs of FIG. 11.

The scores across all situations can then be summed for each cue and then divided by the total number of situations. Thus, for the example mentioned above, the result would be 6/4 or 1.5. The resulting scores can then be provided as the contents for a "cue relatedness" matrix as illustrated in FIG. 12. As can be seen in FIG. 12, the derived index for cues 1 and 3 is listed in the row associated with cue 1, under the column associated with cue 3. In this matrix, the lower the score, the more related the two cues are, and the more strongly they can be linked in an associative network, such as network 210.

Conventional tools can then be used to create an associative network, such as network 210. These tools can take raw pair-wise association values and create an associative network that graphically demonstrates these associations. The final network does not display the strength of the individual associations. An assessment can be made of violations of triangular inequality. This inequality basically states that if there is a direct link that has a weight (i.e., distance) that is larger than that of an indirect path, the link is deleted. For example, if a link exist between nodes 1 and 2 with a weight of 3, and there is an indirect path between these two nodes through node 4 with a weight of 2 (e.g., the link between nodes 1 and 4 has a weight of 2 and the weight between nodes 4 and 2 has a weight of 2), the direct link between nodes 1 and 2 will be deleted. How the strength of the path is measured (i.e., by the sum of weights, by Euclidean distance, or by maximum single weight) can be conventionally determined by the value of their correlation.

Research has shown that with dynamic environments such as the simulated task described herein, individuals tend to have distinct cognitive models that are tied to their skill level, as well as their past experiences with the task environment. Therefore, a key question concerns whether the differences between individual cognitive models is sufficient to necessitate development of individualized models.

An examination of the differences between the cognitive models of two participants found substantial dissimilarities. A separate consideration of the cues and situations appearing in the models found that there was only a 26% overlap for both cues and situations. Thus, only 26% of the total cues identified by the two participants described above were used by both participants. Similarly, only 26% of the total situations identified by the two (2) participants were utilized by both participants. There can be tremendous dissimilarity between two (2) models. Thus, while two participants may exhibit similar levels of proficiency for a task, there may be subtle variations in their conceptualization of cues, situations and actions that lead to distinct differences in models of their behavior.

Figure 6:
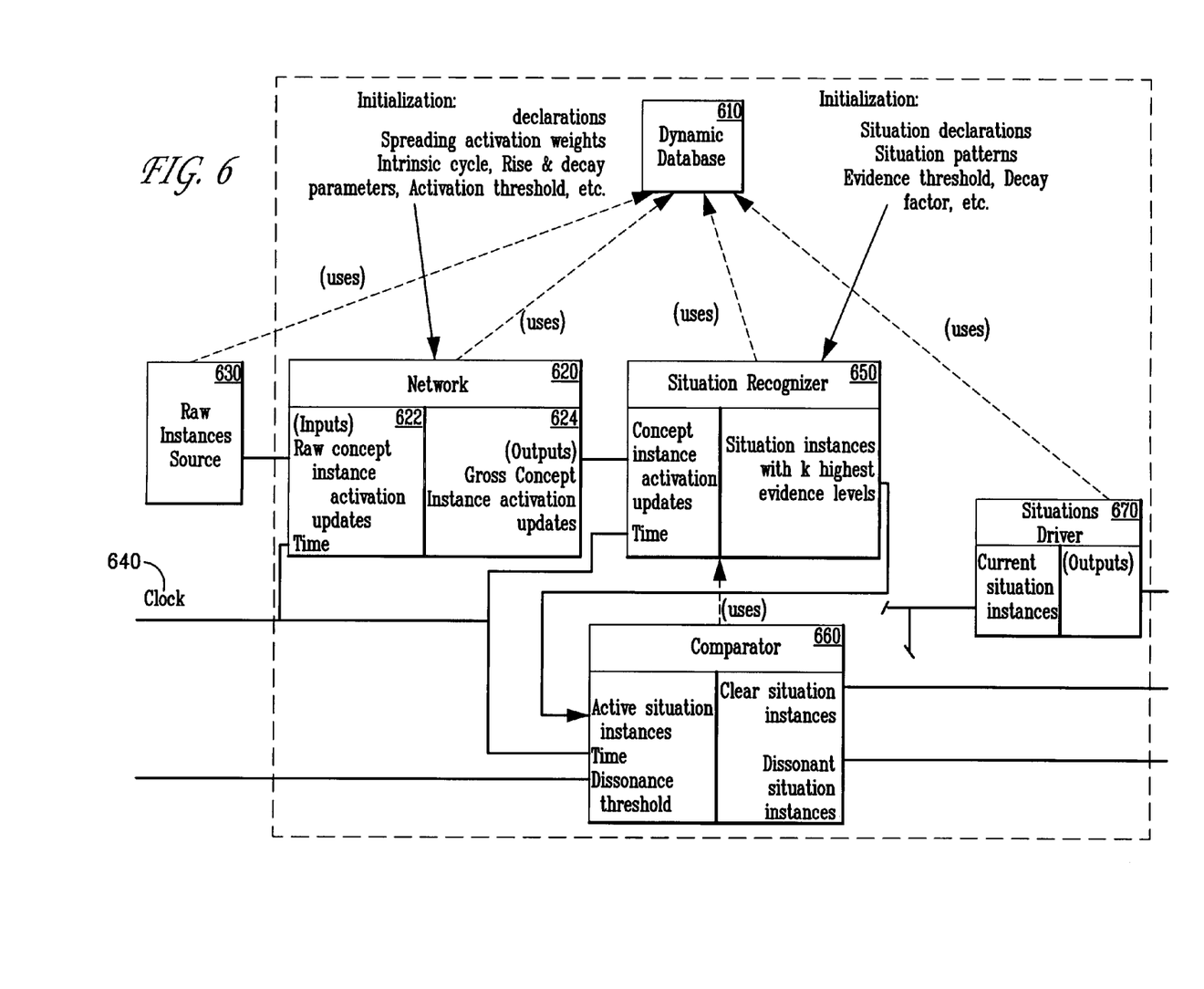
FIG. 6 diagrammatically illustrates exemplary embodiments of a network and core in accordance with exemplary embodiments of the present invention.

The operational cognitive model can run on the core elements of a cognitive framework that can be implemented in hardware, software or a combination thereof. An instance of the cognitive framework "kernel" can be implemented as a network of modules comprising a Cues Database, an Associative Network, a Situation Recognizer, a Comparator, and a Situations-Cue Driver. At initialization, these modules can load the data files that together specify all the components of a particular cognitive model, such as cue declarations, situation declarations, spreading activation weights, and situation-cue-patterns. FIG. 6 diagrammatically illustrates exemplary embodiments of the implementation of a cognitive framework in accordance with exemplary embodiments of the present invention.

In the exemplary embodiment illustrated in FIG. 6, dynamic database 610 and network 620 can contain the "semantic" knowledge within a given cognitive model. In some exemplary embodiments, network 620 can be an associative network. In some exemplary embodiments, network 620 can be a semantic activation network. In some exemplary embodiments, database 610 can contain concepts. In some exemplary embodiments, database 610 can contain cues. Dynamic database 610 can use data from source 630, network 620, situation recognizer 650, and situation driver 670 to maintain the dynamic nature of the data in database 610. A database 610 that can contain cues, can contain the name and arity of each cue and also all current instances of each cue, obtained from source 630. In some exemplary embodiments, source 630 can provide cues. In some exemplary embodiments, source 630 can provide concepts. An instance, such as a cue, from source 630 can be a particular tuple of entity identifiers (entity IDs) that can have the same arity as that cue. Cues of arity zero can be allowed, and such cues may have at most one current instance. Each cue instance from source 630 can be associated with a raw activation level 622 and a gross activation level 624. In some exemplary embodiments, only cue instances from source 630 that have non-zero raw or gross activation are kept in database 610. Cue definitions may be added at any time during execution and can be read from a file at system initialization. Incomplete cue instance can be modeled through the use of a nonspecific entity ID (described below).

The raw, input activation levels 622 of cue instances from source 630 can represent perceptual output and knowledge of ongoing events. The gross, output activation level 624 of a cue instance from source 630 can take into account spreading activation and psycho-physiological factors. Both activation levels 622 and 624 can be dynamic quantities, and network 620 can be responsible for updating gross activation 624 of each cue instance 630 that has a non-zero raw activation level 622 or a non-zero gross activation level 624. When both activation levels 622 and 624 of a cue instance from source 630 go to zero, it can cease to exist and be purged from database 610.

Network 620 can model the oscillatory behavior of neural assemblies, such as neural assemblies 221, 222, 223, and 224 of FIG. 2, while enabling separate activation levels 622 and 624 for individual instances of each cue from source 630. Within network 620, nodes (not shown) can each be associated with an oscillator. Each node can govern a particular cue from source 630 and the gross activations 624 of its instances. The activation level and oscillatory period of each node can be re-computed before the beginning of each of its cycles using clock 640. Clock 640 controls the timing of network 620, situation recognizer 650, and comparator 660. For each node, raw net activation can be computed from the raw activations 622 of instances of the node's cue and from spreading activation from other nodes. In some exemplary embodiments, mechanisms for modeling effects from emotional associativity and top-down activation can also be included. Currently, change in node activation from cycle to cycle is further governed by rise and decay factors; more sophisticated mechanisms can be implemented by workers in the art. Oscillation frequency, and thus, cycle period, can be determined from node activation. If there is adequate activation, the cycle can start immediately, but otherwise, the cycle can begin with the network cycle. Finally, the gross activation levels 624 of individual cue instances from source 630 associated with a node can be determined by portioning out node activation in proportion to raw cue instance activation, combining it with individual raw cue instance activation, and then applying rise and decay factors to changes. Logarithmic compression can be used to prevent blow-up of node and cue instance activation levels and to roughly model electrophysiological limitations.

In some exemplary embodiments of the computational framework of the present invention, a situation from situation driver 670 can have a name and an arity, and an instance of a situation can be a particular tuple of entity identifiers (entity IDs) that has the same arity as that situation. The non-specific entity ID can be a legal value for tuple components, allowing the incomplete specification of a situation and, further, enabling recognition of a situation from incomplete information. What is conventionally called "situation recognition" often really refers to recognition of a set of situation instances.

In some exemplary embodiments of the framework, situation recognition can be performed by situation recognizer 650 and can be based on an evidence accumulation-and-decay process. The immediate evidence for a situation instance is computed from the gross activation levels 624 of cue instances from source 630 by matching the cue pattern for that situation using comparator 660. A situation-cue pattern can fit the regular expression <sit_name> <pattern_len> {<concept_name> <weight> <index_ptr>*}+, where <sit_name> can be the situation name, <pattern_len> can be the number of cue instances that can contribute to the evidence, i.e., the number of {<concept_name> <weight> <index_ptr>*} triples that follow, <concept_name> can be the name of a cue whose instances can contribute subject to the matching criterion, <weight> can be a multiplicative factor applied to the gross activation level of such a cue instance, and <index_ptr>* can be a map from the indices of the cue to the indices of the situation.

The last of these can specify the matching criterion that can be applied to cue instances that contribute to the evidence for a particular situation instance via the pattern. Activation of a cue (concept instance) whose corresponding weight in the pattern is negative can result in evidence against a situation instance. The immediate evidence for a given situation instance can be evaluated for the set of maximally complete matchings of cue instances to its cue pattern, so that positive and negative evidence can be maximally accounted for. Roughly, viewing situation patterns and instances and cue instances as formulae, a situation pattern and a collection of cue instances can be a member of this set if and only if the cue instances in the collection simultaneously unify with the pattern and no additional current cue instances can simultaneously unify with it. Allowances (in the definition of unification and unifiability) can be made for incompletely specified cue instances, although this capability was not needed to obtain the results reported here.

The immediate level of evidence for each situation instance can be updated simultaneously at regular intervals corresponding to a bandwidth associated with situation recognition. Gross evidence levels can be updated at the same intervals. The updated gross evidence level of a situation instance can be based on the sum of its immediate evidence level and the product of its previous gross evidence level and a decay factor. If the evidence level for a situation instance exceeds a model-dependent threshold, that situation instance can be considered recognized. In some exemplary embodiments, an emotional weighting factor associated with the situation may be applied to the immediate evidence level. This factor may be used, for example, in modeling cognitive evaluation of the relative urgency of recognized situations.

Even when the (overall) evidence level of a given situation is above threshold, there may be significant evidence against it due to negatively weighted cues (concept instances). In some exemplary embodiments, comparator 660 can split the output of situation recognizer 650 into a set of situation instances for which the evidence against exceeds a given threshold and a set of situation instances for which this is not the case. Such "mismatch" information can be used to influence additional processing, such as to modulate discrepancy detection and resulting actions.

Certain situations may be cues for other situations. In some exemplary embodiments, situations driver 670 can enable the evidence level of situation instances at its inputs to determine the raw activation level 622 of a corresponding cue instance from source 630 by sending messages to a raw cues instance activator (not shown). In an exemplary system, the raw cues instance activator functionality can be merged into a conventional modeling and simulation module that can interface with output from the task environment. An exemplary embodiment of this module is described below.

The source code of the task environment described above was instrumented to detect and report cues judged by the test subjects to be of importance. To minimize code changes, the data transfer was implemented as an augmentation to the console output. Using conventional techniques, software can be created to intercept this output, extract relevant information, and inject it into a cognitive model for situation recognition and discrepancy detection. In some exemplary embodiments, the main function of the module can be to parse a text message stream from a instrumented task environment and create cue instances (with raw activation levels) that reflect task states that the operator can be expected to perceive. For some exemplary embodiments, the module can also produce action-name and action-bindings (entity ID tuples) that can be input to the discrepancy detection module.

Figure 7:
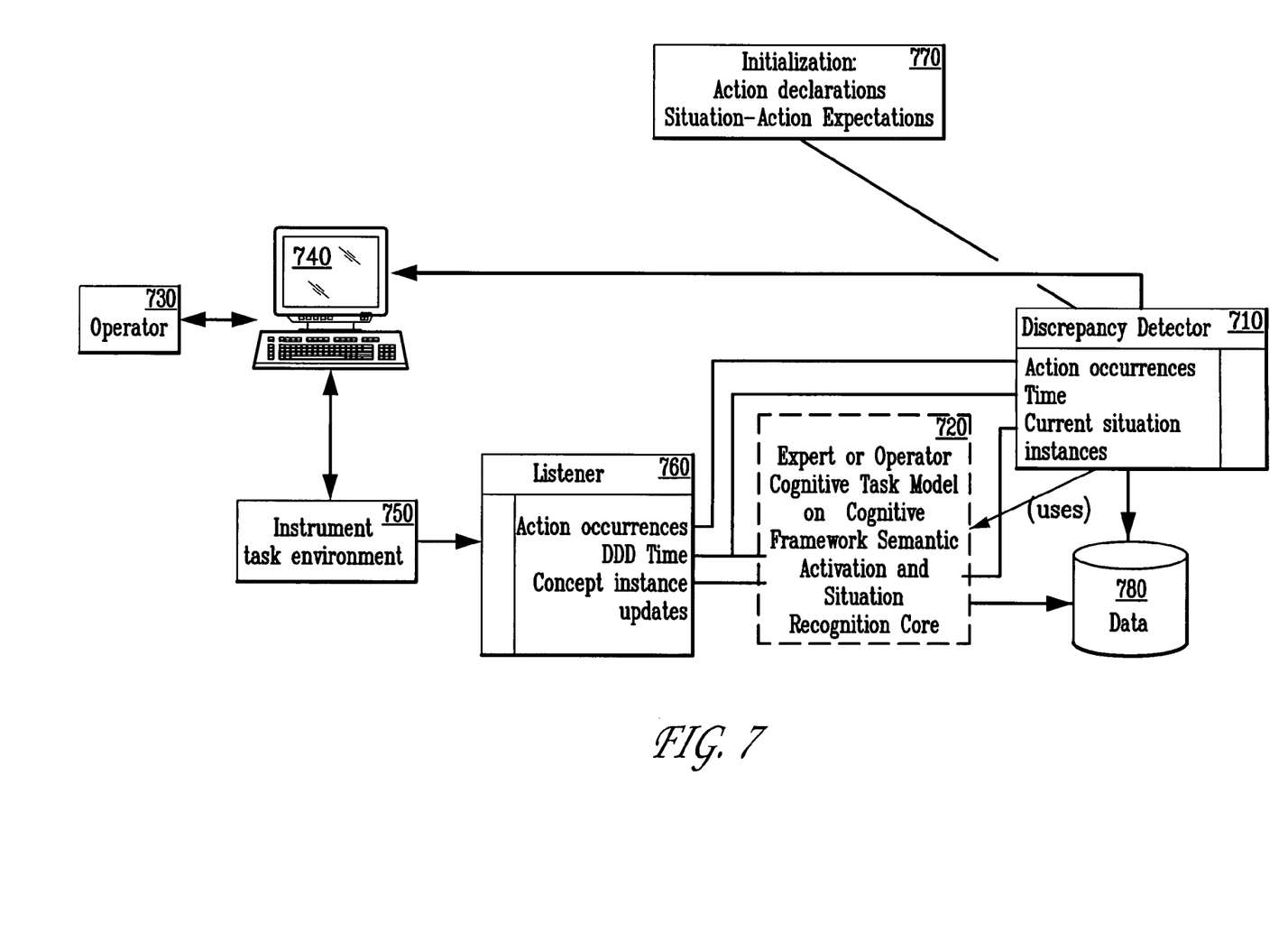
FIG. 7 diagrammatically illustrates an exemplary framework to implement a discrepancy detection function in accordance with exemplary embodiments of the present invention.

An exemplary apparatus and method of discrepancy detection that is based on the actions expected under various conditions (i.e., situations) is illustrated in FIG. 7. In general, in the context of a particular situation instance, it is expected that an operator will perform certain actions—"what needs to be done"—with respect to the entities in the situation instance. The pattern of action expectations can be derived from knowledge elicitation. Discrepancy detector 710 can take as realtime input current situation instances inferred by cognitive model 720 and reported actions of operator 730 as obtained via station 740. In some exemplary embodiments, station 740 can be a workstation, a personal computer ("PC"), a personal digital assistant ("PDA"), or a community screen. In some exemplary embodiments of the present invention these actions can be reported by instrumented task environment 750 to listener 760, which can interface with discrepancy detector 710 and cognitive model 720. Data from cognitive model 720 and discrepancy detector 710 can be stored in and obtained from database 780.

An action can have a name and an arity, and an instance of an action can be a particular tuple of entity IDs that has the same arity as the action. An action occurrence can be an action instance and the time at which it happens. Operator awareness of a situation instance can be confirmed by expected action occurrences according to the operator cognitive model, created in accordance with exemplary embodiments of the present invention. In some exemplary embodiments, discrepancy detector 710 can read the actions to be monitored, the situations to be monitored, and the situation-action expectations from a data file at initialization 770.

In some exemplary embodiments, a situation-action expectation pattern can fit the regular expression <sit_name> <num_exptd_actions> {<act_name> <weight> <idx_ptr>* <anticip> <start_lag> [<end_lag>]}+ where: <sit_name> can be the name of a situation, <num_exptd_actions> can be the number of action expectations, <act_name> can be the name of an action, <weight> can be the weight an action occurrence fitting the instance and timing constraints is given to confirm that the appropriate situation instance has been recognized, <idx_ptr>* can be a map from the indices of the action to the indices of the situation, with −1 specifying that a component be ignored, <anticip> can be the greatest amount of time by which an action instance may precede (anticipate) a situation instance to count in confirming its recognition, <start_lag> can be the greatest amount of time an action occurrence may lag behind the onset of a situation instance to count in confirming its recognition, and <end_lag> can be the greatest amount of time an action occurrence may lag behind the end of a situation instance to count in confirming its recognition.

When one of the last three parameters of an action expectation is negative that parameter can be ignored. A "situation instance" can refer to a situation instance inferred by the cognitive model. The time-window during which an action must occur relative to an interval corresponding to a situation instance can be described more generally. In some exemplary embodiments, there can be a generalization to the case where an action occurrence corresponds to an interval of time rather than a point in time.

During task execution, discrepancy detector 710 can score the fulfillment of action occurrence expectations for situation instances inferred by cognitive model 720 in order to determine operator awareness during the lifetime of each situation instance. If the score for a situation instance exceeds a confirmation threshold, it can be considered agreement, but if the score is below a threshold, it can be considered a situation recognition discrepancy. The system can also recognize a discrepancy if the score for a situation instance goes negative (i.e., due to action occurrences corresponding to negative weights).

In some exemplary embodiments, discrepancy detector 710 can also report action occurrences that are not associated with inferred situation instances. By default, such action occurrences can be reported as, for example, unexplained. However, if discrepancy detector 710 is directed to audit an action, its occurrences that are not associated with any inferred situation instances non-negatively can be reported as, for example, inappropriate.

It will be evident to workers in the art that the exemplary embodiments described herein can be readily implemented by suitable modifications in software, hardware or a combination of software and hardware in conventional digital systems, such as simulators, PCs, and PDAs.

Although exemplary embodiments of the present invention have been described in detail, it will be understood by workers in the art that various modifications can be made therein without departing from the spirit and scope of the invention as set forth in the appended claims.

What is claimed is:

1. An apparatus for enhancing human task performance, the apparatus comprising:
   a first input for obtaining a first set of data descriptive of a current environment;
   a first modeler for creating a first representation of the current environment based on the first set of data;
   a second input for obtaining a second set of data descriptive of at least one action of a user;
   a second modeler for creating a second representation of the current environment including the at least one action of the user based on the second set of data;
   a detector for detecting at least one difference between the first representation and the second representation; and
   an interface for providing the at least one difference to the user.

2. The apparatus of claim 1, wherein said first modeler includes:
   a library for storing a set of information representative or environments previously encountered by the apparatus;
   an episodic memory unit for providing a history of previously performed actions taken in environments previously encountered by the apparatus, said episodic memory unit using the set of information from the library to create the history;
   a pattern recognizer for recognizing a pattern between the current environment and the history; and
   a semantic unit for receiving the first set of data and preparing the first set of data for pattern recognition by said pattern recognizer.

3. The apparatus of claim 2, wherein said semantic unit includes a network of associations.

4. The apparatus of claim 3, wherein the network of associations is a network of associations between a set of concepts.

5. The apparatus of claim 3 wherein the network of associations is a network of associations between a set of cues.

6. The apparatus of claim 1 wherein said second modeler includes:
   a library for storing a set of information representative of environments previously encountered by the apparatus;
   a pattern recognizer for recognizing a pattern between the second set of data and the second set of information; and
   a semantic unit for receiving the second set of data and preparing the second set of data for pattern recognition by said pattern recognizer.

7. The apparatus of claim 6, wherein said semantic unit includes a network of associations.

8. The apparatus of claim 7, wherein the network of associations is a network of associations between a set of concepts.

9. The apparatus of claim 7 wherein the network of associations is a network of associations between a set of cues.

10. The apparatus of claim 1 wherein said detector includes a comparator for comparing the first representation and the second representation.

11. A method, practiced on an electronic device, for enhancing human task performance, the method comprising:
    obtaining a first set of data descriptive of a current environment;
    creating a first representation of the current environment based on the first set of data;
    obtaining a second set of data descriptive of at least one action of a user;
    creating a second representation of the current environment including the at least one action of the user based on the second set of data;
    detecting at least one difference between the first representation and the second representation; and
    providing the at least one difference to the user.

12. The method of claim 11, wherein said first creating step includes:
    accessing a set of information representative of environments previously encountered;
    creating, based on the set of information, a history of previously performed actions taken in environments previously encountered;
    preparing the first set of data for pattern recognition; and
    recognizing a pattern between the first set of data and the history.

13. The method of claim 12, wherein said recognizing step includes developing a network of associations.

14. The method of claim 13, wherein said developing step includes developing a network of associations between a set of concepts.

15. The method of claim 13 wherein said developing step includes developing a network of associations between a set of cues.

16. The method of claim 11 wherein said second creating step includes:
    storing a set of information representative of environments previously encountered by the apparatus;
    preparing the second set of data for pattern recognition; and
    recognizing a pattern between the second set of data and the set of information.

17. The method of claim 16, wherein said recognizing step includes developing a network of associations.

18. The method of claim 17, wherein said developing step includes developing a network of associations between a set of concepts.

19. The method of claim 17 wherein said developing step includes developing a network of associations between a set of cues.

20. The method of claim 11 wherein said detecting step includes comparing the first representation and the second representation.

* * * * *